(12) United States Patent
Delisle

(10) Patent No.: US 8,578,886 B1
(45) Date of Patent: Nov. 12, 2013

(54) PIVOT LID LITTER BOX ASSEMBLY

(76) Inventor: Robin E. Delisle, Rivera Beach, FL (US)

( * ) Notice: Subject to any disclaimer, the term of this patent is extended or adjusted under 35 U.S.C. 154(b) by 125 days.

(21) Appl. No.: 13/224,094

(22) Filed: Sep. 1, 2011

(51) Int. Cl.
*A01K 1/035* (2006.01)

(52) U.S. Cl.
USPC .......................................... 119/166; 119/165

(58) Field of Classification Search
USPC ............. 119/55, 76, 161, 162, 163, 164, 165, 119/166, 167, 168, 169, 170; 220/810, 220/23.87, 262–264, 908, 908.1, 345.4, 348
See application file for complete search history.

(56) References Cited

U.S. PATENT DOCUMENTS

| | | | |
|---|---|---|---|
| 1,964,513 A * | 6/1934 | Hammer | 220/254.2 |
| 2,549,572 A * | 4/1951 | Campanelli | 220/212 |
| 4,200,197 A * | 4/1980 | Meyer et al. | 220/263 |
| 5,163,574 A * | 11/1992 | Sosan | 220/264 |
| 5,259,340 A | 11/1993 | Arbogast | |
| 5,348,222 A * | 9/1994 | Patey | 232/43.2 |
| 5,372,271 A * | 12/1994 | Miller et al. | 220/263 |
| 5,511,682 A * | 4/1996 | Pace | 280/47.26 |
| 5,562,318 A | 10/1996 | McBroom | |
| 5,775,258 A | 7/1998 | Larsen et al. | |
| 5,855,186 A * | 1/1999 | Larsen et al. | 119/166 |
| D409,804 S | 5/1999 | Nunes | |
| 5,921,596 A | 7/1999 | Sheriff et al. | |
| 6,298,808 B1 * | 10/2001 | Crafton et al. | 119/165 |
| 6,371,048 B1 | 4/2002 | Smith | |
| 6,626,317 B2 | 9/2003 | Pfiefer et al. | |
| 6,837,393 B1 | 1/2005 | Kuo | |
| 6,981,606 B2 | 1/2006 | Yang et al. | |
| 6,983,685 B2 * | 1/2006 | Ko | 100/229 A |
| 7,487,743 B1 * | 2/2009 | Lane | 119/166 |
| 8,096,565 B2 * | 1/2012 | Meers | 280/47.26 |
| 2001/0052522 A1 * | 12/2001 | Forest | 220/495.07 |
| 2003/0010415 A1 * | 1/2003 | Szuszkiewicz | 150/154 |

* cited by examiner

*Primary Examiner* — Rob Swiatek
*Assistant Examiner* — Ebony Evans

(57) ABSTRACT

A pivoting lid litter box assembly provides a litter box having a pan and a pivoted lid to facilitate access to contents of a pan. The assembly includes a pan having a bottom and a perimeter wall extending upwardly from a perimeter edge of the bottom. A lid is pivotally coupled to the pan. The lid has a top and a sidewall extending down from the top. The sidewall of the lid rests on the perimeter wall of the pan defining an interior space. The sidewall has an opening providing access to the interior space through the opening in the sidewall. A pedal is coupled to the pan and operationally coupled to the lid for selectively pivoting the lid between an open position and a closed position. A scoop having an extended handle and storage compartment may be provided to facilitate removing waste from the pan.

11 Claims, 3 Drawing Sheets

PIVOT LID LITTER BOX ASSEMBLY

BACKGROUND OF THE DISCLOSURE

Field of the Disclosure

The disclosure relates to litter box devices and more particularly pertains to a new litter box device providing a pan and a pivoted lid to facilitate access to contents of the pan.

SUMMARY OF THE DISCLOSURE

An embodiment of the disclosure meets the needs presented above by generally comprising a pan having a bottom and a perimeter wall extending upwardly from a perimeter edge of the bottom. A lid is pivotally coupled to the pan. The lid has a top and a sidewall extending down from the top. The sidewall of the lid rests on the perimeter wall of the pan defining an interior space. The sidewall has an opening providing access to the interior space through the opening in the sidewall. A pedal is coupled to the pan and operationally coupled to the lid for selectively pivoting the lid between an open position and a closed position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
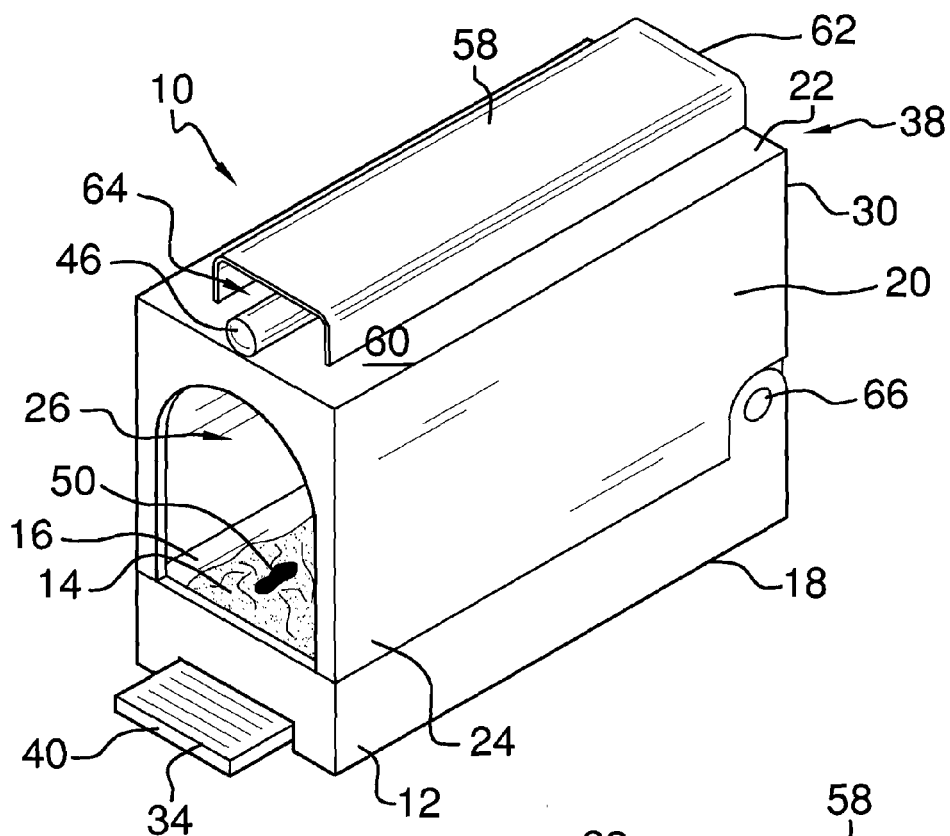
FIG. 1 is a top front side perspective view of a pivoting lid litter box assembly according to an embodiment of the disclosure.
Figure 2:
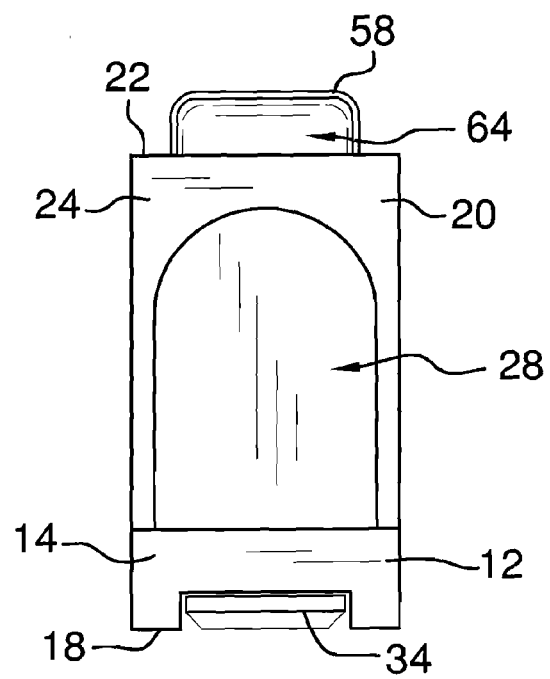
FIG. 2 is a front view of an embodiment of the disclosure.
Figure 3:
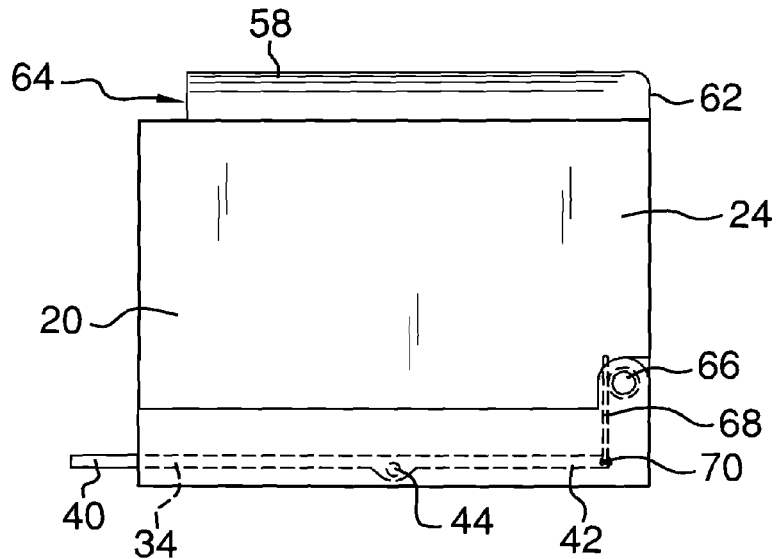
FIG. 3 is a side view of an embodiment of the disclosure.
Figure 4:
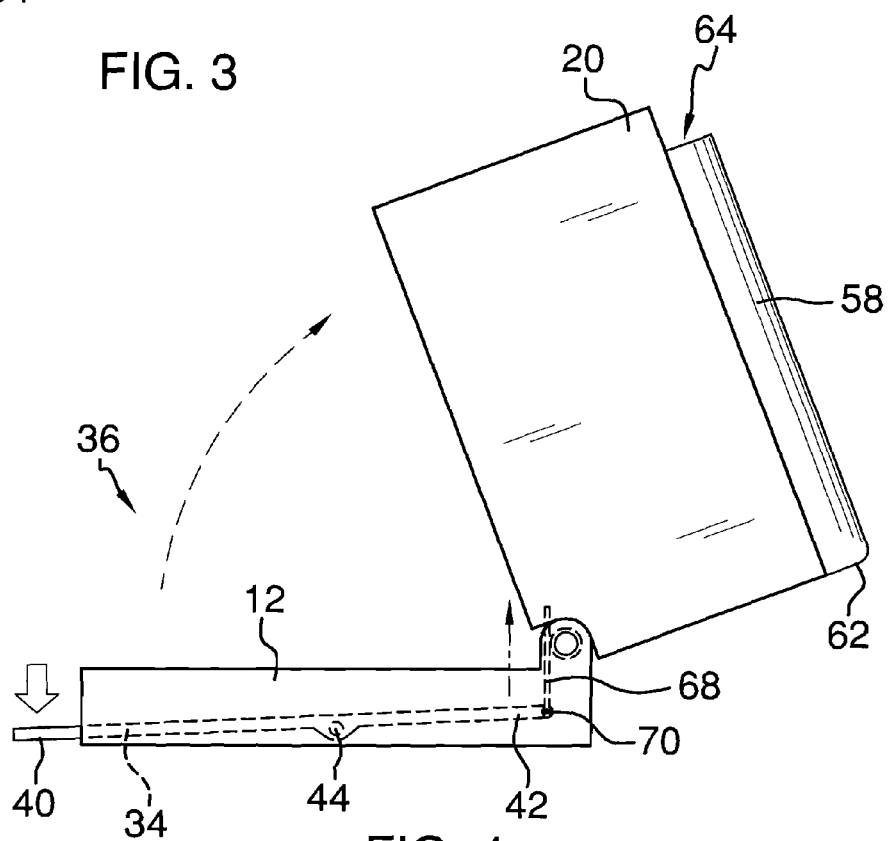
FIG. 4 is a side view of an embodiment of the disclosure in an open position.

With reference now to the drawings, and in particular to FIGS. 1 through 6 thereof, a new litter box device embodying the principles and concepts of an embodiment of the disclosure and generally designated by the reference numeral 10 will be described.

As best illustrated in FIGS. 1 through 6, the pivoting lid litter box assembly 10 generally comprises a pan 12 having a bottom 14 and a perimeter wall 16 extending upwardly from a perimeter edge 18 of the bottom 14. A lid 20 is pivotally coupled to the pan 12. The lid 20 has a top 22 and a sidewall 24 extending down from the top 22. The sidewall 24 of the lid 20 rests on the perimeter wall 16 of the pan 12 defining an interior space 26. The sidewall 24 has an opening 28 providing access to the interior space 26 through the opening 28 in the sidewall 24. Thus, animals utilizing the assembly 10 may pass freely into and out of the interior space 26 to deposit animal waste 50 in the pan 12. The lid 20 has a rear end 30 opposite the opening 28. The rear end 30 is pivotally coupled to the pan 12. A pedal 34 is coupled to the pan 12. The pedal 34 is operationally coupled to the lid 20 for selectively pivoting the lid 20 between an open position 36 and a closed position 38. The pedal 34 may be elongated having a first end 40 and a second end 42. The first end 40 extends from the pan 12 to facilitate stepping on the pedal 34. The pedal 34 may have a medial point 44 between the first end 40 and the second end 42. The medial point 44 is pivotally coupled to the pan 12 whereby the second end 42 of the pedal 34 elevates when the first end 40 of the pedal 34 is depressed. The second end 42 of the pedal 34 is operationally coupled to the lid 20 to open the lid 20 when the first end 40 of the pedal 34 is depressed. A hinge pin 66 may be fixedly coupled to the lid 20 and pivotally coupled to the pan 12. An actuating arm 68 may then be provided having a lower end 70 coupled to the second end 42 of the pedal 34. The arm 68 contacts the hinge pin 66 and rotates the hinge pin 66 relative to the pan 12 whereby the lid 20 pivots relative to the pan 12 when the first end 40 of the pedal 34 is depressed.

A scoop 46 is provided having a telescopic handle 48. The scoop 46 is configured for scooping the animal waste 50 from the pan 12. The scoop 46 has a head portion 52 having a plurality of apertures 54 or slits whereby the scoop 46 is also configured for removing clumped cat litter 56 from the pan 12 to permit removal of both fecal matter and urine from the pan 12.

A compartment 58 may be coupled to an upper surface 60 of the top 22. The compartment 58 has a closed end 62 and an open end 64 such that the scoop 46 is insertable into the compartment 58 for storage. The head portion 52 is insertable through the open end 64 for storage in the compartment 58. The closed end 62 of the compartment 58 may be positioned adjacent to the rear end 30 of the lid 20 so that the scoop 46 is not unintentionally removed from the compartment 58 by gravity when the lid 20 is pivoted into the open position 36.

Figure 5:
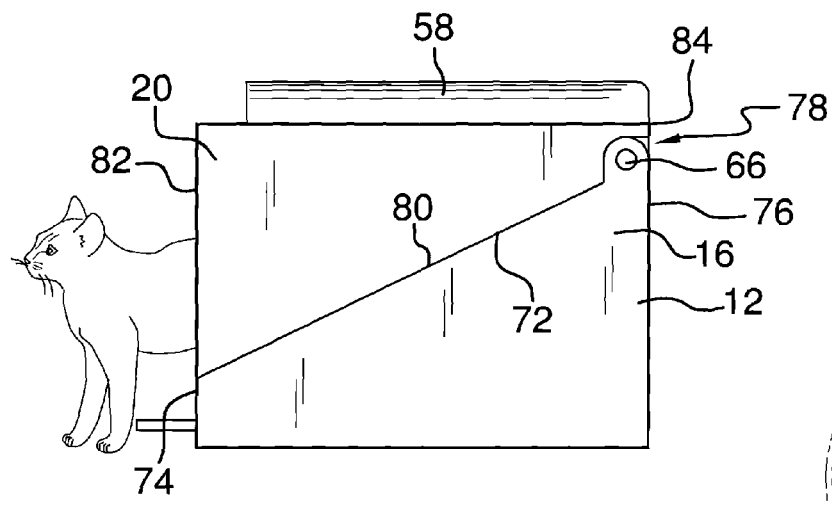
FIG. 5 is a side view of an alternative embodiment of the disclosure.
Figure 6:
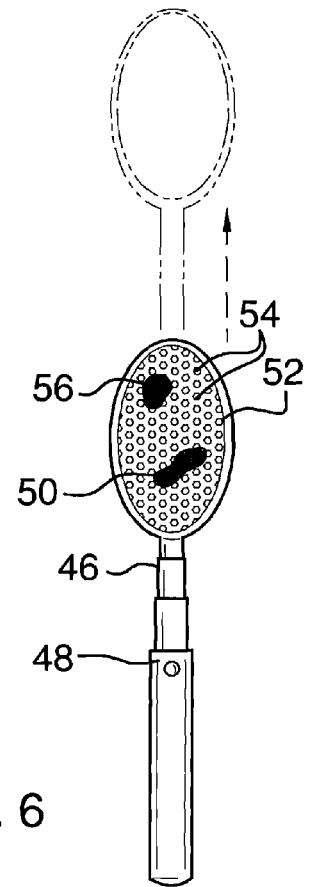
FIG. 6 is a front view of a scoop of an embodiment of the disclosure.

An upper edge 72 of the perimeter wall 16 may be parallel to the bottom 14 of the pan 12, as shown in FIG. 1. Alternatively, the upper edge 72 may be angled upwardly from a forward end 74 of the pan 12 to a rearward end 76 of the pan 12 effectively elevating a pivot point 78 of the lid 20 and providing enhanced access to the pan 12 when the lid 20 is pivoted. In this embodiment, as shown in FIG. 5, a lower edge 80 of the sidewall 24 is angled upwardly from a forward end 82 of the lid 20 to a rearward end 84 of the lid 20 complementary to the angling of the upper edge 72 whereby the top 22 remains in a horizontal position in when the lid 20 is in the closed position 38.

In use, the pan 12 receives the animal waste 50. Periodically, the animal waste 50 may be removed by depressing the first end 40 of the pedal 34 to pivot the lid 20 into the open position 36 providing enhanced access to contents of the pan 12. The scoop 46 may be removed from the compartment 58 and utilized to remove the animal waste 50. The scoop 46 may be stored by replacement back into the compartment 58.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A litter box assembly comprising:
a pan having a bottom and a perimeter wall extending upwardly from a perimeter edge of said bottom;
a lid, said lid being pivotally coupled to said pan, said lid having a top and a sidewall extending down from said top, said sidewall of said lid resting on said perimeter wall of said pan defining an interior space, said sidewall having an opening providing access to said interior space through said opening in said sidewall;
a pedal coupled to said pan, said pedal being operationally coupled to said lid for selectively pivoting said lid between an open position and a closed position;
a scoop having a handle, said scoop being configured for scooping waste from said pan; and
a compartment coupled to an upper surface of said top, said compartment having a top surface and a peripheral wall extending between said top surface of said compartment and said upper surface of said top, said top surface and said peripheral wall defining a closed end and an open end of said compartment whereby said scoop is insertable into said compartment through said open end for storage in said compartment.

2. The assembly of claim 1, further including said lid having a rear end opposite said opening, said rear end being pivotally coupled to said pan.

3. The assembly of claim 2, further including said closed end of said compartment being positioned adjacent to said rear end of said lid.

4. The assembly of claim 1, further including an upper edge of said perimeter wall being angled upwardly from a forward end of said pan to a rearward end of said pan.

5. The assembly of claim 4, further including a lower edge of said sidewall being angled upwardly from a forward end of said lid to a rearward end of said lid.

6. The assembly of claim 1, further including said scoop having a head portion, said head portion having a plurality of apertures whereby said scoop is configured for removing clumped cat litter from said pan.

7. The assembly of claim 1, further including said handle of said scoop being telescopic.

8. The assembly of claim 1, further including said pedal being elongated, said pedal having a first end and a second end, said first end extending from said pan, said pedal having a medial point between said first end and said second end, said medial point being pivotally coupled to said pan whereby said second end of said pedal elevates when said first end of said pedal is depressed, said second end of said pedal being operationally coupled to said lid whereby said lid opens when said first end of said pedal is depressed.

9. The assembly of claim 8, further comprising:
a hinge pin fixedly coupled to said lid, said hinge pin being pivotally coupled to said pan; and
an arm having a lower end coupled to said second end of said pedal, said arm contacting said hinge pin and rotating said hinge pin relative to said pan whereby said lid pivots relative to said pan when said first end of said pedal is depressed.

10. A litter box assembly comprising:
a pan having a bottom and a perimeter wall extending upwardly from a perimeter edge of said bottom;
a lid, said lid being pivotally coupled to said pan, said lid having a top and a sidewall extending down from said top, said sidewall of said lid resting on said perimeter wall of said pan defining an interior space, said sidewall having an opening providing access to said interior space through said opening in said sidewall, said lid having a rear end opposite said opening, said rear end being pivotally coupled to said pan;
a pedal coupled to said pan, said pedal being operationally coupled to said lid for selectively pivoting said lid between an open position and a closed position, said pedal being elongated, said pedal having a first end and a second end, said first end extending from said pan, said pedal having a medial point between said first end and said second end, said medial point being pivotally coupled to said pan whereby said second end of said pedal elevates when said first end of said pedal is depressed, said second end of said pedal being operationally coupled to said lid whereby said lid opens when said first end of said pedal is depressed;
a scoop having a telescopic handle, said scoop being configured for scooping waste from said pan, said scoop having a head portion, said head portion having a plurality of apertures whereby said scoop is configured for removing clumped cat litter from said pan;
a compartment coupled to an upper surface of said top, said compartment having a top surface and a peripheral wall extending between said top surface of said compartment and said upper surface of said top, said top surface and said peripheral wall defining a closed end and an open end of said compartment whereby said scoop is insertable into said compartment through said open end for storage in said compartment, said closed end of said compartment being positioned adjacent to said rear end of said lid;
a hinge pin fixedly coupled to said lid, said hinge pin being pivotally coupled to said pan; and
an arm having a lower end coupled to said second end of said pedal, said arm contacting said hinge pin and rotating said hinge pin relative to said pan whereby said lid pivots relative to said pan when said first end of said pedal is depressed.

11. The assembly of claim 10, further comprising:
an upper edge of said perimeter wall being angled upwardly from a forward end of said pan to a rearward end of said pan; and
a lower edge of said sidewall being angled upwardly from a forward end of said lid to a rearward end of said lid.

* * * * *